United States Patent [19]

Ohkawa et al.

[11] 4,366,269
[45] * Dec. 28, 1982

[54] RESIN COATED FOUNDRY SAND USING CRYSTALLINE UNSATURATED POLYESTER AS BINDER

[75] Inventors: Koue Ohkawa, Yokohama; Shin Fujii, Zama; Takashi Seino, Yokosuka, all of Japan

[73] Assignee: Nissan Motor Co., Ltd., Yokohama, Japan

[ * ] Notice: The portion of the term of this patent subsequent to Jan. 20, 1998, has been disclaimed.

[21] Appl. No.: 157,191

[22] Filed: Jun. 6, 1980

[30] Foreign Application Priority Data

Jun. 9, 1979 [JP] Japan .................................. 54-71835

[51] Int. Cl.$^3$ ............................................. C08L 67/06
[52] U.S. Cl. .................................... 523/148; 523/512; 524/492; 525/445
[58] Field of Search ...................... 260/40 R, DIG. 40; 525/445, 447

[56] References Cited

U.S. PATENT DOCUMENTS 2,930,089  3/1960  Emblem et al. ............ 260/DIG. 40
3,962,162  6/1976  Schmank ..................... 260/22 CB

FOREIGN PATENT DOCUMENTS

1642377  3/1972  Fed. Rep. of Germany .
 555660  2/1960  France .
1584006 12/1969  France .
2190548  2/1974  France .
 799613  8/1958  United Kingdom .
 815084  6/1959  United Kingdom .
1007168 10/1965  United Kingdom .
1106191  3/1968  United Kingdom .
1342599  1/1974  United Kingdom .

Primary Examiner—Theodore E. Pertilla
Attorney, Agent, or Firm—Schwartz, Jeffery, Schwaab, Mack, Blumenthal & Koch

[57] ABSTRACT

Resin coated foundry sand, using a binder composition comprising 100 parts by weight of a crystalline unsaturated polyester and, as a cross-linking agent, 5 to 30 parts by weight of diallyl phthalate monomer. The binder is a scarcely tacky solid at room temperature but at a temperature somewhat above its softening temperature assumes a fluid state and exhibits a viscosity below about 500 poises. The resin coated sand is prepared by mixing heated foundry sand with the binder composition, with the addition of an organic peroxide which serves as a curing catalyst. Moulds and cores formed of this resin coated sand are high in initial strength but, nevertheless, can easily be disintegrated at the shake-off stage even when a relatively low pouring temperature is employed as in an aluminum alloy casting process.

8 Claims, 9 Drawing Figures

RESIN COATED FOUNDRY SAND USING CRYSTALLINE UNSATURATED POLYESTER AS BINDER

BACKGROUND OF THE INVENTION

This invention relates to a binder composition for binding foundry sand for forming molds and cores for use in a sand molds casting process and also to a resin coated sand prepared by using the same binder composition and a process of preparing the same resin coated sand.

In current sand mold casting processes, molds and cores are usually formed of a resin coated sand for which the use of a phenol resin is the most prevailing. Molds and cores formed of a phenol resin coated sand are high in physical strength after curing of the coated resin by a baking procedure which can be completed in a short time. However, the use of a phenol resin as the binder material for resin coated sand has offered some problems to sand mold casting processes. First, ammonia gas is liberated and accordingly an irritating odor is emitted during the baking procedure to complete the forming of the molds and cores because of partial decomposition of hexamethylenetetramine which is usually used as a cross-linking agent for a phenol resin. Second, in some alloy casting processes characterized by relatively low pouring temperatures, for example in aluminum alloy casting processes, the molds and cores, particularly the latter, retain their toughness even at the shake-out stage after solidification of the poured molten metal partly because the phenol resin undergoes partial carbonization by the heat of the molten metal with the result that the sand particles adhere strongly to each other or to the alloy casting, and therefore the cores cannot easily be disintegrated.

To solve such problems we have already proposed in our prior U.S. Patent Application Ser. No. 967,541 filed Dec. 7, 1978 now U.S. Pat. No. 4,246,165 to prepare a resin coated sand by using a crystalline unsaturated polyester resin as a binder material in place of a phenol resin. The moulds and cores formed of the proposed resin coated sand do not give out an irritating odour during baking and, as a more important feature, even cores used in aluminum alloy casting processes can easily be disintegrated at the shake-out stage.

However, unsaturated polyester resins are inherently lower in physical strength than phenol resins, so that in the case of using an unsaturated polyester resin often it becomes necessary to increase the proportion of the resin to foundry sand to be coated than in the case of using a phenol resin.

SUMMARY OF THE INVENTION

It is an object of the present invention to provide an improved binder composition for the preparation of resin coated sand for forming molds and cores for use in sand mold casting processes including aluminum alloy casting processes, which binder composition does not emit an unpleasant odor when heated during forming of the molds and cores or during casting operation, can afford a sufficiently high initial strength to the molds and cores but, nevertheless, renders the molds and cores readily disintegratable after completion of casting operation even when a relatively low pouring temperature is employed as in an aluminum alloy casting process.

It is another object of the invention to provide a resin coated sand consisting of a conventional foundry sand and an improved binder composition according to the invention.

A binder composition according to the invention comprises 100 parts by weight of a crystalline unsaturated polyester and 5 to 30 parts by weight of diallyl phthalate monomer, which serves as a cross-linking agent, and is a scarcely tacky solid at room temperature, and the viscosity of this binder composition at a temperature about 30° C. above the softening temperature thereof is below about 500 poises.

The most preferably, the crystalline unsaturated polyester is principally the product of a condensation reaction of fumaric acid with ethylene glycol.

A resin coated sand according to the invention comprises a major amount of a foundry sand and a minor amount of a binder composition according to the invention to which is added an organic peroxide as a curing catalyst, the binder composition being in the form of coating on the individual particles of the foundry sand.

Preferably the weight ratio of the binder composition to the sand is in the range from 1:100 to 7:100.

This resin coated sand is prepared by mixing the foundry sand and the binder composition at an elevated temperature at which the binder composition is in a fluid state.

In the present application, "crystalline unsaturated polyester" means a polyester at least partially crystalline to such an extent that crystalline domains can be clearly identified by X-ray diffration analysis, and "scarcely tacky" means that a binder composition, or an unsaturated polyester, is a solid and can be divided into fragments which are individually smaller than 4 mm in the maximum dimension and entirely pass through a 4-mesh screen (openings: 4.76 mm) on a standard sieving machine.

As will be understood from the above statement, the essential feature of the present invention resides in the use of a specified amount of diallyl phthalate monomer as a cross-linking agent for a crystalline unsaturated polyester employed as the principal component of a binder composition for a resin coated sand. If the weight ratio of diallyl phthalate to the unsaturated polyester is made smaller than 5:100, the rate of crystallization of the once fluidized binder composition becomes extremely low and the binder composition cannot afford a sufficiently high initial strength to the molds and cores, so that the binder composition becomes almost impracticable. When the weight ratio is made greater than 30:100, the binder composition tends to give a too wettish resin coated sand which is inferior in formability and cannot afford a sufficiently high initial strength to the molds and cores. By making the weight ratio fall within the range from 5:100 to 30:100, the rate of crystallization of the once fluidized binder composition becomes very high, and the molds and cores formed of a resultant resin coated sand exhibit sufficiently high initial strength but, nevertheless, can readily be disintegrated after solidification of the poured molten metal.

The crystalline unsaturated polyester used in the present invention is one having an average molecular weight of about 1000 to 2000 (before curing). Even an ordinary unsaturated polyester can be rendered a scarcely tacky solid by greatly increasing its molecular weight in the uncured state. However, such a high molecular weight polyester does not exhibit a desirable extent of lowering of viscosity when mixed with foundry sand by a hot-melt method as described hereinafter, so that it becomes impossible to form a resin coating on the surface of individual particles of the sand. If a solvent dilution method is employed a resin coated sand can be prepared even by using such a high molecular weight unsaturated polyester, but the employment of a solvent dilution method is undesirable because the evaporation of the solvent is liable to raise pollution problems. In contrast, the preparation of a resin coated sand by a hot-melt method becomes practicable when use is made of an ordinary unsaturated polyester considerably small in molecular weight, but the resultant resin coated sand does not take the state of a dry coated sand even when sufficiently cooled after completion of mixing operation. Although molds and cores can be formed even by using a wettish coated sand, a significant lowering of productivity is inevitable in the case of forming a large number of molds and cores by using a coated sand in such a state because of inferior fluidity of the wettish coated sand.

A crystalline unsaturated polyester used in the present invention exhibits a satisfactory lowering of viscosity when heated and gives a resin coated sand which is high in fluidity at room temperature. It is preferable that the unsaturated polyester (also a binder composition using this polyester) exhibits a viscosity below about 250 poises at a temperature in the range from about 100° C. to about 130° C.

DESCRIPTION OF THE PREFERRED EMBODIMENTS

A crystalline unsaturated polyester useful in the present invention is obtained by reaction between an α- or β-unsaturated dibasic acid which is solid and crystalline at room temperature and a glycol.

Examples of suitable unsaturated dibasic acids are fumaric acid, citraconic acid, itaconic acid, mesaconic acid and maleic acid anhydride, and substitution products of these acids. Two or more of these compounds may be used jointly. To obtain an unsaturated polyester with a high degree of crystallization, it is preferable to use a dibasic acid sterically having symmetry such as fumaric acid or measconic acid, particularly the former.

A portion of the α- or β-unsaturated dibasic acid may be replaced by a saturated dibasic acid such as terephthalic acid, dimethyl terephthalate, adipic acid, sebacic acid, azelaic acid, isophthalic acid, 3,6-endomethylene-$\Delta^4$-tetrahydrophthalic anhydride, tetrahydrophthalic acid anhydride, hexahydrophthalic acid anhydride or anthracene-maleic anhydride, or an addition or substitution product of such an acid. To enhance the degree of crystallization of the unsaturated polyester, when using a saturated dibasic acid it is preferable to select one sterically having symmetry as exemplified by terephthalic acid, dimethyl terephthalate or adipic acid.

Examples of useful glycols are ethylene glycol, 1,4-butanediol, diethylene glycol, triethylene glycol, 1,6-hexanediol, neopentyl glycol, hydrogenated bisphenol A and metaxylene glycol, and substitution products of these compounds. Each of these glycols is solid and crystalline at room temperature, or sterically has symmetry. Two or more of these glycols may be used jointly.

A condensation polymerization reaction between an unsaturated dibasic acid and a glycol to give an unsaturated polyester is well known and will need no description in this application. By using starting materials selected among the above listed materials and controlling the degree of crystallization by controlled cooling of the polymer once heated to a temperature above its softening point, and optionally by the addition of a substance which serves as crystal nuclei, it is possible to obtain a crystalline unsaturated polyester having an average molecular weight of 1000–2000 and being a scarcely tacky solid at room temperature. An unsaturated polyester thus prepared can be cured by heating it together with a cross-linking monomer (diallyl phthalate in the present invention) in the presence of a catalyst.

As a polymerization or copolymerization catalyst for curing of a binder composition according to the invention during forming of molds and cores of a resin coated foundry sand, it is usual to employ an organic peroxide selected among, for example, benzoyl peroxide, lauroyl peroxide, di-tert-butyl peroxyadipate, dicumyl peroxide, tert-butyl peroxybenzoade, methyl ethyl ketone peroxide and cumene hydroperoxide. If desired, two or more of such peroxides may be used jointly. The catalyst is used in a quantity amounting to 0.1 to 10 parts by weight, preferably 0.5 to 5 parts by weight, for 100 parts by weight of the unsaturated polyester. If the weight ratio of the catalyst to the polyester is below 0.1:100, baking of a resin coated foundry sand prepared according to the invention to form sand molds requires an unduly long length of time. On the other hand, the effect of the catalyst does not significantly augment even if the weight ratio of the catalyst to the polyester exceeds 10:100, so that the use of such a large amount of catalyst is disadvantageous from an economical viewpoint. The catalyst may be admixed into the unsaturated polyester at the stage of preparing a binder composition according to the invention but may alternatively be introduced at the stage of mixing the binder composition and a foundry sand.

Optionally, a binder composition according to the invention may comprise a silane compound as a coupling agent which is effective for enhancement of the strength of a resin coated sand prepared according to the invention and baked to form a sand mold or core. The weight ratio of the coupling agent to the total of the essential components of the binder composition is made to be not greater than 1:10. Examples of useful silane compounds are γ-methacryloxypropyl-trimethyloxy-silane and γ-glycidloxypropyl-trimethyloxy-silane. Alternatively, the coupling agent may be added to a binder composition according to the invention at the stage of mixing the binder composition with a foundry sand.

By way of example, the preparation of a resin coated sand by a hot-melt process according to the invention is accomplished by first preheating a silica sand useful as foundry sand to a temperature of, for example, 170° C., then charging the preheated sand into a conventional sand mixer with the stirrer in operation, then charging a binder composition according to the invention (crystalline unsaturated polyester resin already added with diallyl phthalate and a catalyst but not yet cured) into the same mixer, continuing the operation of the mixer until the temperature of the sand becomes below the softening point of the binder with the result that the binder coated on the surface of each sand particle resumes a crystalline state. Optionally a small quantity of a wax or lubricant such as calcium stearate may be added to the sand-binder mixture at a later stage of the mixing operation with the purpose of augmenting the fluidity of the resin coated sand and preventing agglomeration of the sand particles. By using a resin coated sand thus prepared, molds and cores can be formed by a conventional method. For example, the coated sand is poured into a metal mold which has been preheated to a temperature of 120°–250° C. depending on the width and thickness values of the intended moulds or cores and then baked at about 200° C. for 0.5 to 3 minutes.

The invention will be illustrated by the following examples and comparative experiments.

EXAMPLES 1A–1D

Using a 2-liter four-necked flask, 1126 g of fumaric acid, 44 g of phthalic acid anhydride, 617 g of ethylene glycol and 56 g of diethylene glycol were subjected to esterifying condensation reaction by a usual method to give 1400 g of unsaturated polyester which had an acid value of 25. The polyester was cooled to 120° C. and then mixed with 0.33 g of hydroquinone and 56 g of dicumyl peroxide, and the resultant mixture was divided into seven equal parts.

As Example 1A, 5 parts by weight (10 g in absolute value) of diallyl phthalate (will be abbreviated to DAP) monomer was added to 104 parts by weight (208 g) of the polyester-catalyst mixture, and, besides, 2.5 g of ultrafine particles of silicic acid anhydride (AEROSIL 200 of JAPAN AEROSIL Inc.) were added to the same mixture as crystal nuclei. Continuing vigorous stirring, the resultant mixture was gradually cooled to room temperature. A binder composition thus prepared was left standing for one week and then pulverized to obtain grains which passed through a 16-mesh sieve (openings: 1.0 mm).

Examples 1B, 1C and 1D were similar to Example 1A except that the quantity of DAP monomer was altered to 10 parts by weight (20 g), 20 parts (40 g) and 30 parts (60 g), respectively.

REFERENCES 1A–1C

As References 1A and 1B, Example 1A was repeated except that the quantity of DAP was decreased to 3 parts by weight (6 g) in Reference 1A and to 4 parts by weight (8 g) in Reference 1B. Reference 1C was also similar to Examples 1A–1D except that the quantity of DAP was increased to 40 parts by weight (80 g).

One week after preparation, the binder compositions of References 1B and 1C were pulverized similarly to the binder compositions of Examples 1A–1D. However, the binder composition of Reference 1A could not be pulverized because it did not solidify and was in a soft taffy-like state even after the lapse of one month from its preparation. Therefore, the composition of Reference 1A was not subjected to the following experiment.

EXPERIMENT 1

Six batches of resin coated sand were prepared respectively by using the binder compositions of Examples 1A–1D and References 1B and 1C. The following process was common to these six batches.

4 kg of a commercially available silica sand for foundry use was preheated to 180° C. and then charged into an operating sand mixer. Immediately thereafter, 120 g of the pulverized binder composition was added to the sand in the mixer, with continued stirring. The temperature of the sand lowered gradually, and after the lapse of a certain length of time the binder composition coated on the surfaces of the sand particles began to solidify so that the sand particles began to become loose. At this point of time, 4.8 g of calcium stearate was added to the resin coated sand in the mixer, with still continued stirring, and 30 seconds thereafter the resin coated sand became so loose and fluidic that the individual sand particles were almost completely separate from one another. Accordingly the resin coated sand was discharged from the mixer at this time point. Hereinafter, the term "mixing time" in the preparation of a resin coated sand means the length of time from the addition of a binder composition to a heated foundry sand in a mixer to the discharge of resin coated sand particles in an almost completely separated state from the mixer.

Figure 1:
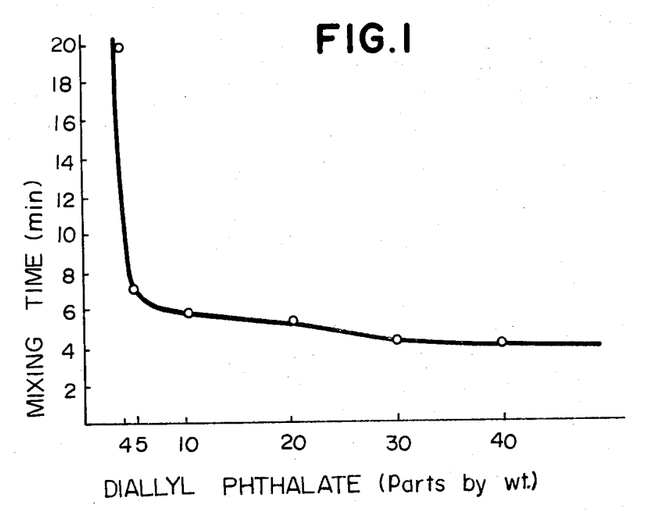
FIG. 1 is a graph showing the relationship between the amount of diallyl phthalate in a binder composition and an appropriate length of mixing time to prepare a resin coated sand with respect to several binder compositions most of which are according to the present invention.

FIG. 1 shows a variation in the mixing time in the preparation of the six batches of resin coated sand in this Experiment.

The experimental result shown in FIG. 1 demonstrates that the preparation of a resin coated sand using a binder composition according to the invention (comprising at least 5 parts by weight of DAP monomer to 100 parts by weight of an unsaturated polyester) can be completed in a satisfactorily short mixing time, and that in the case of a binder composition analogous but comprising only 4 parts by weight of DAP the mixing time becomes about three times as long as in the case of the present invention, meaning a significant lowering of productivity of resin coated sand.

Figure 2:
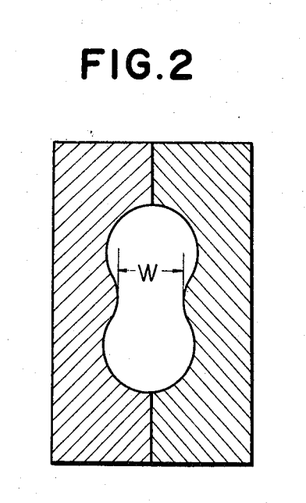
FIG. 2 is a horizontal sectional view of a metal molds for the preparation of test pieces for tensile strength test of a resin coated foundry sand.

Each of these six batches of resin coated sand was subjected to measurement of bulk density, and test pieces formed of each resin coated sand were subjected to tensile strength test at room temperature. FIG. 2 shows a horizontal section of a die set used for the forming of the test pieces. Each resin coated sand was poured into the cavity of the die set and baked at 230° C. for 70 seconds to form a test piece which was a plate having a plan view shape like a dumb-bell. The width W (indicated in FIG. 2) in the middle of the die cavity was 25.4 mm and the depth of the die cavity was 6.35 mm.

Figure 3:
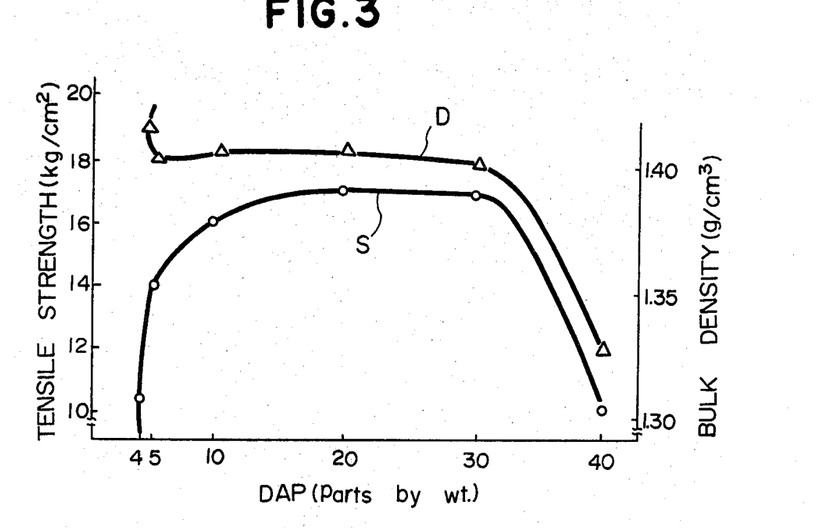
FIG. 3 is a graph showing an experimental result illustrative of the dependence of the strength and bulk density of binder compositions, most of which are according to the invention, on the amount of diallyl phthalate (DAP) in each binder composition.

The experimental results are shown in FIG. 3, wherein the curve D represents the results of measurement of bulk density for the six batches of resin coated sand and the curve S represents the results of the tensile strength test at room temperature. The tensile strength values shown in FIG. 3 are each an average of measurements of ten test pieces.

The curve D in FIG. 3 demonstrates that the bulk density of a resin coated sand of the tested type becomes surprisingly low when the amount of DAP exceeds 30 parts by weight to 100 parts by weight of unsaturated polyester resin. A resin coated sand low in bulk density is unsuitable for practical use because of the occurrence of casting defects such as penetration of molten metal and sand inclusion in casting processes using molds and cores formed of such a resin coated sand.

The curve S in FIG. 3 demonstrates that the strength of molds and cores formed of a resin coated sand of the tested type becomes very low not only when the amount of DAP in the binder composition is insufficient but also when the binder composition comprises more than 30 parts by weight of DAP to 100 parts of unsaturated polyester resin, so that it becomes necessary to use a greatly increased amount of such a binder composition if it is intended to realize a strength value comparable to the values exhibited by using binder compositions according to the invention (comprising 5 to 30 parts by weight of DAP to 100 parts by weight of unsaturated polyester). However, such increase in the amount of binder composition results in the occurrence of casting defects such as blows because of generation of an increased quantity of gas from the molds and cores during a casting process and, besides, is undesirable also from an economical viewpoint.

EXAMPLE 2

In a four-necked flask having a capacity of 2 liters, 1137 g of fumaric acid, 29 g of adipic acid and 652 g of ethylene glycol were subjected to an esterifying condensation reaction by a usual method to form 1400 g of unsaturated polyester which had an acid value of 30. The unsaturated polyester was cooled to 115° C., and 0.33 g of parabenzoquinone, 280 g of DAP monomer and 16.5 g of ultrafine particles of silicic acid anhydride (AEROSIL 200) were added to and mixed with the unsaturated polyester. (The relative amount of the DAP monomer was 20 parts by weight to 100 parts by weight of the polyester.) Furthermore, 42 g of tert-butyl peroxybenzoade was added to the mixture in the flask, and the resultant mixture was gradually cooled to room temperature, with continued stirring. After the lapse of one week from preparation, a binder composition thus prepared was pulverized into particles passing through a 16-mesh sieve.

Then a resin coated sand was prepared by first charging 4 kg of silica sand (the same kind as the one used in Experiment 1) preheated to 180° C. into an operating sand mixer, then adding 120 g of the pulverized binder composition of Example 2 to the sand in the mixer and thereafter following the mixing and cooling procedure in Experiment 1.

REFERENCE 2

The synthesis of 1400 g of an unsaturated polyester was performed in accordance with Example 2, and the polyester was cooled to room temperature. Then, 0.33 g of parabenzoquinone, 420 g of styrene monomer and 16.5 g of silicic acid anhydride in the form of ultrafine particles (AEROSIL 200) were added to and mixed with the polyester. (The relative amount of the styrene monomer was 30 parts by weight to 100 parts by weight of the unsaturated polyester.) Furthermore, 42 g of tert-butyl peroxybenzoate was added to the mixture in the flask, and the resultant mixture was gradually cooled to room temperature, with continued stirring. After the lapse of one week, a binder composition thus prepared was pulverized into particles passing through a 16-mesh sieve.

Then, a resin coated sand was prepared in accordance with Example 2 except that 120 g of the pulverized binder composition of Reference 2 was used in place of the binder of Example 2.

EXPERIMENT 2

The resin coated sand of Example 2 had a bulk density of 1.41 g/cm$^3$, and the resin coated sand of Reference 2 had a bulk density of 1.45 g/cm$^3$.

Test pieces for tensile strength test for these two kinds of resin coated sand were formed and baked in the manner as described in Experiment 1. The resin coated sand of Example 2 exhibited a room temperature tensile strength value of 16.5 kg/cm$^2$ as an average of test results on ten test pieces, whereas the resin coated sand of Reference 2 exhibited a room temperature tensile strength value of 9.2 kg/cm$^2$ as an average of test results on ten test pieces.

Figure 4:
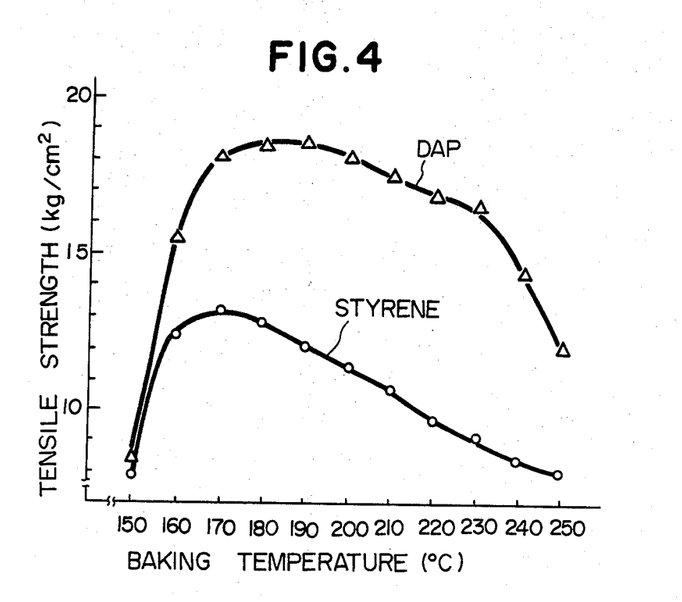
FIG. 4 is a graph showing an experimental result illustrative of the dependence of the strength of sand molds formed by using a binder composition according to the invention on the baking temperature for the forming of the molds in comparison with sand molds formed by using a different binder composition.

The tensile strength test for these two kinds of resin coated sand were repeated by varying the baking temperature for the forming of the test pieces within the range from 150° C. to 250° C. The results are shown in FIG. 4 and demonstrate superiority of DAP as a crosslinking agent to styrene.

EXPERIMENT 3

Figure 5:
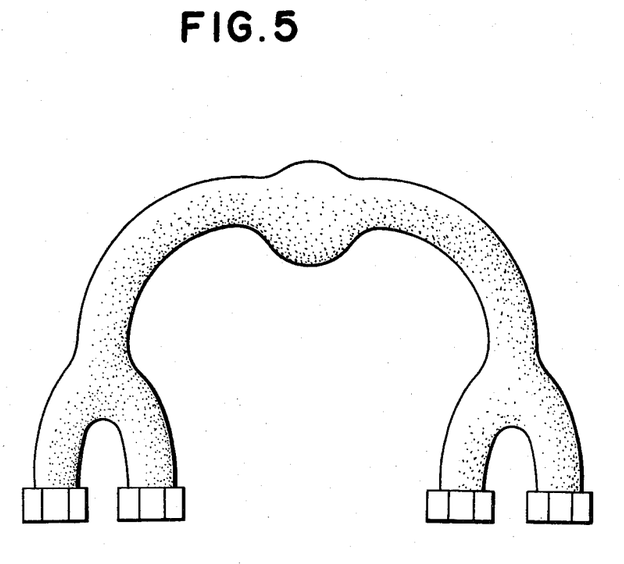
FIG. 5 is a front view of a sand core for casting of an intake manifold of an automotive engine.

A port core, as shown in FIG. 5, for an intake manifold for a 1.8-liter automotive engine was formed of the resin coated sand of Example 2 by means of a blowing Shell machine through baking at 270° C. for 30 seconds, and an intake manifold of aluminum alloy (AC2A) was cast by using this core. The cast product had no casting defects, and the shake-out of the casting to completely disintegrate the port core was achieved merely by applying rather weak shocks to the casting by operating a pneumatic vibrational knock-out machine for 30 seconds at an air pressure of 5 kg/cm$^2$. This is an evidence of an excellent disintegratability of cores formed of a resin coated sand according to the present invention even in the case of aluminum alloy casting processes wherein a relatively low pouring temperature is employed.

EXAMPLES 3A–3D

In a four-necked flask having a capacity of 2 liters, 1126 g of fumaric acid, 44 g of phthalic acid anhydride, 617 g of ethylene glycol and 56 g of diethylene glycol were subjected to esterifying condensation reaction by a usual method to form about 1400 g of unsaturated polyester, which had an acid value of 28 and a number average molecular weight of 1450. The unsaturated polyester was cooled to 120° C., and 0.33 of hydroquinone, 56 g of dicumyl peroxide were added to and mixed with this polyester. The resultant mixture was divided into seven equal parts.

As Example 3A, 5 parts by weight (10 g in absolute value) of DAP monomer was added to 104 parts by weight (208 g) of the catalyst-containing unsaturated polyester, and furthermore, 2.5 g of ultrafine particles of silicic acid anhydride (AEROSIL 200) were added to the same mixture as crystal nuclei. Continuing vigorous stirring, the resultant mixture was subjected to cooling to room temperature. After the lapse of one week, a binder composition thus prepared was pulverized into particles passing through a 16-mesh sieve.

Examples 3B, 3C and 3D were similar to Example 3A except that the quantity of DAP monomer was altered to 10 parts by weight (20 g), 20 parts by weight (40 g) and 30 parts by weight (60 g), respectively.

REFERENCES 3A-3C

As References 3A and 3B, Example 3A was repeated except that the quantity of DAP monomer was decreased to 3 parts by weight (6 g) in Reference 3A and to 4 parts by weight in Reference 3B. Reference 3C was also similar to Examples 3A-3D except that the quantity of DAP monomer was increased to 40 parts by weight (80 g).

One week after preparation, the binder compositions of References 3B and 3C could be pulverized similarly to the binder compositions of Examples 3A-3D. However, the binder composition of Reference 3A could not be pulverized because it did not solidify and was in a soft taffy-like state even after the lapse of one month from its preparation. Therefore, the binder composition of Reference 3A was not subjected to the following experiment

EXPERIMENT 4

Six batches of resin coated sand were prepared respectively by using the binder compositions of Examples 3A-3D and References 3B and 3C by the employment of the same materials and process as in Experiment 1.

Figure 6:
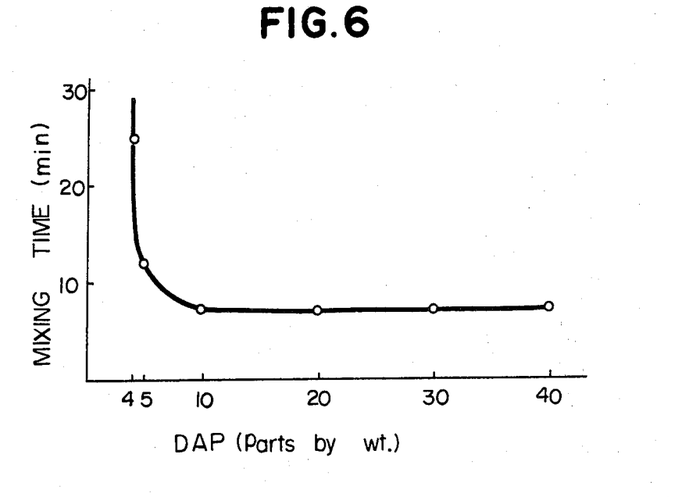
FIGS. 6 and 8 are graphs showing the same matter as the graph of FIG. 1 with respect to different kinds of binder compositions most of which are according to the invention.

FIG. 6 shows a variation in the mixing time in the preparation of the six batches of resin coated sand in this Experiment.

Figure 7:
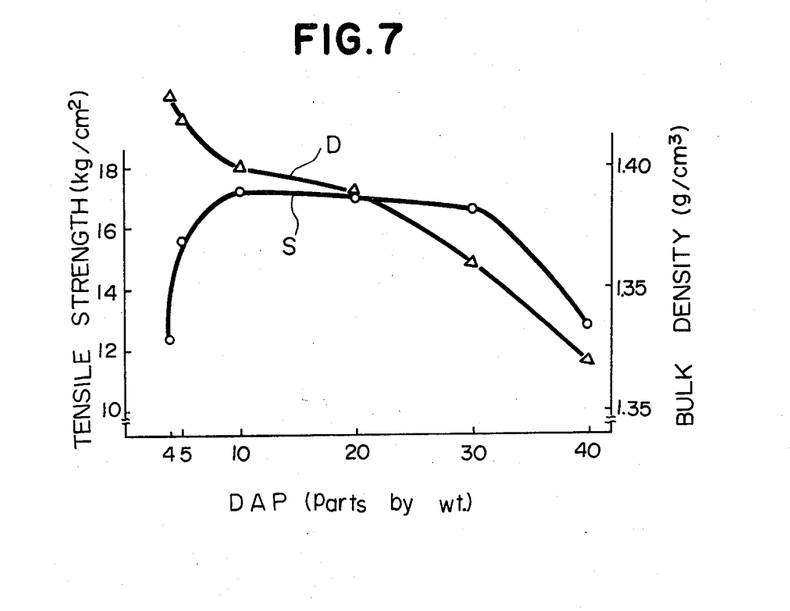
FIGS. 7 and 9 are graphs showing the same matter as the graph of FIG. 3 with respect to different kinds of binder composition most of which are according to the invention.

The measurements of bulk density and tensile strength at room temperature for each of these six kinds of resin coated sand were performed in accordance with Experiment 1, and the results are shown in FIG. 7, wherein the curves D and S show bulk density and tensile strength, respectively.

The experimental result shown in FIG. 6 demonstrates that when a binder composition comprises only less than 5 parts by weight of DAP monomer to 100 parts by weight of unsaturated polyester the preparation of resin coated sand requires a considerably long mixing time and suffers lowered productivity. The experimental results shown in FIG. 7 demonstrate that the strength of molds and cores at room temperature lowers when formed of a binder composition comprising either less than 5 parts by weight or more than 30 parts by weight of DAP monomer to 100 parts by weight of unsaturated polyester resin, and that when the quantity of DAP monomer exceeds 30 parts by weight the bulk density of the resin coated sand too becomes very low.

EXAMPLES 4A-4D

In a 2-liter four-necked flask, 1161 g of fumaric acid, 587 g of ethylene glycol and 80 g of trimethylene glycol were subjected to an esterifying condensation reaction by a usual method to form about 1400 g of unsaturated polyester which had an acid value of 23 and a number average molecular weight of 1750. The unsaturated polyester was cooled to 120° C., and 0.31 g of hydroquinone, 0.16 g of parabenzoquinone and 56 g of dicumyl peroxide were added to and mixed with the cooled polyester. The resultant mixture was divided into seven equal parts.

As Example 4A, 5 parts by weight of DAP monomer (10 g in absolute value) was added to 104 parts by weight (208 g) of the catalyst-containing unsaturated polyester, and thereafter the addition of ultrafine particles of silicic acid anhydride and the subsequent cooling and pulverizing steps were performed in accordance with Example 3A.

Examples 4B, 4C and 4D were similar to Example 4A except that the quantity of DAP monomer was altered to 10 parts by weight (20 g), 20 parts by weight (40 g) and 30 parts by weight (60 g), respectively.

REFERENCES 4A-4C

References 4A and 4B were similar to Example 4A except that the quantity of DAP monomer was decreased to 3 parts by weight (6 g) in Reference 4A and to 4 parts by weight (8 g) in Reference 4B. Reference 4C was also similar to Examples 4A-4D except that the quantity of DAP monomer was increased to 40 parts by weight (80 g). However, the binder composition of Reference 4A could not be pulverized because it did not solidify and was in a soft taffy-like state even after the lapse of one month from its preparation. Therefore, the binder composition of Reference 4A was not subjected to the following experiment.

EXPERIMENT 5

Six different batches of resin coated sand were prepared respectively by using the binder compositions of Examples 4A-4D and References 4B and 4C and otherwise by the employment of the same materials and process as in Experiment 1.

Figure 8:
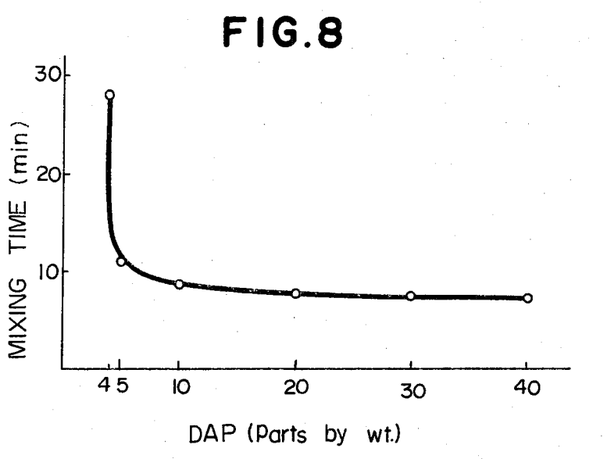

FIG. 8 shows a variation in the mixing time in the preparation of the six batches of resin coated sand in this Experiment.

Figure 9:
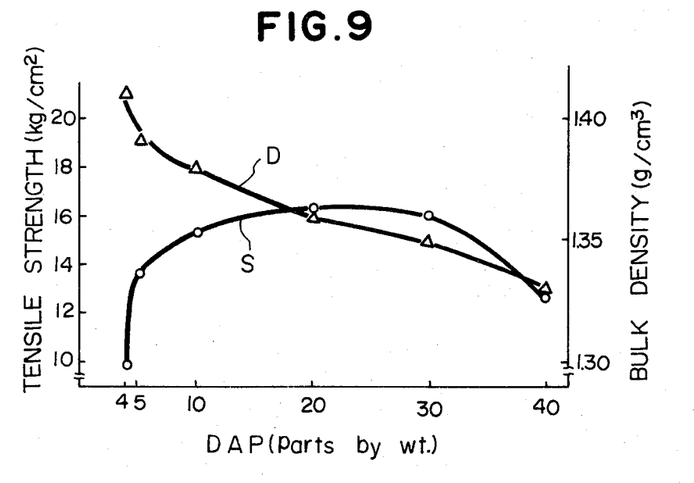

The measurement of bulk density and tensile strength at room temperature for each of these six kinds of resin coated sand were performed in accordance with Experiment 1, and the results are shown in FIG. 9, wherein the curves D and S represent bulk density and tensile strength, respectively. The experimental results shown in FIGS. 8 and 9 again demonstrate the existence of the already described tendencies in the physical properties depending on the weight ratio of DAP to unsaturated polyester.

EXAMPLE 5

In a 2-liter four-necked flask, 1236 g of mesaconic acid, 83 g of terephthalic acid, 1039 g of neopentyl glycol and 89 g of triethylene glycol were subjected to an esterifying condensation reaction by a usual method. Obtained as the result was about 1900 g of unsaturated polyester which had an acid value of 32. This polyester was cooled to 145° C. Then 0.46 g of parabenzoquinone, 380 g of DAP monomer (20 parts by weight to 100 parts of unsaturated polyester) and 22.4 g of ultrafine particles of silicic acid anhydride (AEROSIL 200) were added to the cooled polyester, followed by the addition of 42 g of tert-butyl peroxybenzoade. The resultant mixture was stirred vigorously and subjected to cooling to room temperature. A binder composition thus prepared was left standing for one week and then pulverized into particles passing through a 16-mesh sieve.

EXAMPLE 6

A binder composition was prepared in accordance with Example 2 except that 280 g of iso-diallyl phthalate monomer was used in place of the same quantity of diallyl phthalate monomer in Example 2.

REFERENCE 5

1400 g of crystalline unsaturated polyester was prepared in accordance with Example 2 and cooled to 130° C. Then 0.33 g of parabenzoquinone, 420 g of divinylbenzene monomer (30 parts by weight to 100 parts by weight of unsaturated polyester) and 16.5 g of ultrafine particles of silicic acid anhydride (AEROSIL 200) were added to and mixed with the cooled polyester, followed by the addition of 42 g of tert-butyl peroxybenzoade. The resultant mixture was well mixed and gradually cooled to room temperature with continued stirring. After one week, a binder composition thus prepared was pulverized into particles passing through a 16-mesh sieve.

EXPERIMENT 6

Three batches of resin coated sand were prepared respectively by using the binder compositions prepared in Examples 5 and 6 and Reference 5 and otherwise by the same materials and process as in Experiment 1.

The measurement of bulk density and tensile strength at room temperature for each of these three kinds of resin coated sand were performed in accordance with Experiment 1. The results were as follows.

|  | Bulk Density (g/cm$^3$) | Room Temperature Tensile Strength (kg/cm$^2$) |
|---|---|---|
| Example 5 | 1.38 | 15.2 |
| Example 6 | 1.40 | 14.9 |
| Reference 5 | 1.36 | 10.1 |

What is claimed is:

1. A process of preparing a resin coated sand for forming molds and cores for use in a sand molding process, the process comprising the step of:
    mixing a major amount of a foundry sand with a minor amount of a binder composition which comprises a crystalline unsaturated polyester which is solid at room temperature as a principal component thereof and diallyl phthalate, the weight ratio of said diallyl phthalate to said unsaturated polyester being in the range from 5:100 to 30:100, at an elevated temperature at which said binder composition is in a fluidized state in the presence of an organic peroxide which serves as a curing catalyst for said unsaturated polyester, the weight ratio of said organic peroxide to said unsaturated polyester being in the range of 0.1:100 to 10:100, said binder composition being a scarcely tacky solid at room temperature, the viscosity of said binder composition at a temperature about 30° C. above the softening temperature thereof being below about 500 poises.

2. A process according to claim 1, wherein said crystalline unsaturated polyester has an average molecular weight of about 1000 to about 2000 and is principally the product of a condensation reaction between at least one glycol and at least one unsaturated dibasic acid selected from the group consisting of fumaric acid, citraconic acid, itaconic acid, mesaconic acid and maleic acid anhydride.

3. A process according to claim 2, wherein said crystalline unsaturated polyester is principally the product of a condensation reaction between fumaric acid and ethylene glycol.

4. A process according to claim 1, wherein the weight ratio of said binder composition to said foundry sand is in the range from 1:100 to 7:100.

5. A resin coated sand for forming molds and cores for use in a sand mold casting process, comprising
    a major amount of a foundry sand; and
    a miner amount of a binder composition which is in the form of coating on the individual particles of said foundry sand,
    said binder composition comprising a crystalline unsaturated polyester which is solid at room temperature as a component therefor, diallyl phthalate monomer and an organic peroxide which serves as a curing catalyst for said unsaturated polyester, the weight ratio of said diallyl phthalate to said unsaturated polyester being in the range from 5:100 to 30:100, the weight ratio of said organic peroxide to said unsaturated polyester to said unsaturated polyester being in the range of 0.1:100 to 10:100, said binder composition being a scarcely tacky solid at room temperature, the viscosity of said binder composition at a temperature about 30° C. above the softening temperature thereof being below about 500 poises.

6. A resin coated sand according to claim 5, wherein said crystalline unsaturated polyester has an average molecular weight of about 1000 to about 2000 and is principally the product of a condensation reaction between at least one glycol and at least one unsaturated dibasic acid selected from the group consisting of fumaric acid, citraconic acid, itaconic acid, mesaconic acid and maleic acid anhydride.

7. A resin coated sand according to claim 6, wherein said crystalline unsaturated polyester is principally the product of a condensation reaction between fumaric acid and ethylene glycol.

8. A resin coated sand according to claim 6, wherein the weight ratio of said binder composition to said foundry sand is in the range from 1:100 to 7:100.

* * * * *